(12) United States Patent
Ogasawara

(10) Patent No.: US 12,623,560 B2
(45) Date of Patent: May 12, 2026

(54) CHARGING INLET WITH NOSE-SUPPRESSING CAP CLOSING MECHANISM

(71) Applicant: Yazaki Corporation, Tokyo (JP)

(72) Inventor: Shigeyuki Ogasawara, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 302 days.

(21) Appl. No.: 18/390,788

(22) Filed: Dec. 20, 2023

(65) Prior Publication Data

US 2024/0208341 A1    Jun. 27, 2024

(30) Foreign Application Priority Data

Dec. 22, 2022    (JP) ................................. 2022-205096

(51) Int. Cl.
*B60L 53/16*        (2019.01)
*H01R 13/447*       (2006.01)

(52) U.S. Cl.
CPC ............ *B60L 53/16* (2019.02); *H01R 13/447* (2013.01); *H01R 2201/26* (2013.01)

(58) Field of Classification Search
CPC .............. H01R 13/447; H01R 13/5213; H01R 2201/26; H01R 13/453; H01R 13/533; H01R 13/639; H01R 13/713; H01R 13/58; B60L 53/16
See application file for complete search history.

(56) References Cited

U.S. PATENT DOCUMENTS

| | | | | |
|---|---|---|---|---|
| 5,588,853 | A * | 12/1996 | Anthony ............ | H01R 13/5213 220/375 |
| 2014/0111144 | A1* | 4/2014 | Mo ......................... | B60L 53/16 320/107 |
| 2015/0229055 | A1 | 8/2015 | Fukushima et al. | |
| 2020/0223321 | A1 | 7/2020 | Myer et al. | |
| 2020/0266578 | A1* | 8/2020 | Durse ..................... | B60L 53/16 |
| 2022/0340025 | A1* | 10/2022 | Hitchcock .......... | H01R 13/5213 |
| 2022/0379749 | A1* | 12/2022 | Underhill ................ | B60L 53/16 |

FOREIGN PATENT DOCUMENTS

| | | |
|---|---|---|
| JP | 8-96863 A | 4/1996 |
| JP | 2014-099256 A | 5/2014 |
| JP | 2016-152197 A | 8/2016 |
| JP | 2017-174509 A | 9/2017 |
| JP | 2018-65532 A | 4/2018 |

* cited by examiner

*Primary Examiner* — Tulsidas C Patel
*Assistant Examiner* — Carlos E Lopez-Pagan
(74) *Attorney, Agent, or Firm* — Sughrue Mion, PLLC

(57)            ABSTRACT
A charging inlet includes an inlet body, a DC socket cap (inlet cap) configured to occlude a DC socket area (occlusion area) of a penetration hole in a housing to make the occlusion area to be openable and closable and to cover a DC socket (mechanical portion) of a socket portion (connection mechanism) in an occlusion state; and a connection portion, characterized in that the DC socket cap (inlet cap) includes a cap body portion, and an inlet abutment portion which is a projection locally provided at a position separating from the connection portion in a facing portion of the inlet body, wherein the inlet abutment portion comes into contact with the inlet body earlier than any other portion in the cap body portion when the cap body portion rotates to reach the occlusion state.

8 Claims, 4 Drawing Sheets

FIG. 1

CHARGING INLET WITH NOSE-SUPPRESSING CAP CLOSING MECHANISM

TECHNICAL FIELD

The present invention relates to a charging inlet including an inlet body and an inlet cap.

BACKGROUND ART

A charging inlet is used as a vehicle-side connector for charging a battery mounted on an Electric Vehicle (EV), a Plug-in Hybrid Vehicle (PHV) or the like from an external energizer. As described in Patent Document 1, a charging inlet the mechanism having a plurality of terminals and corresponding to a charging standard for connecting with a charging-side connector. Also, this charging inlet is provided with an inlet body having a connection mechanism with a mating connector for charging and an inlet cap that is attached to the inlet body to be openable and closable, wherein the inlet cap covers the connection mechanism with the mating connector in an occlusion state. This inlet cap is in a closed state at a non-charge timing.

CITATION LIST

Patent Documents

[Patent Document 1] JP 2014-99256A

SUMMARY OF THE INVENTION

Technical Problem

Here, when the inlet cap in the above-described charging inlet is to be closed, the inlet body abuts to the plate-shaped inlet cap so as to generate collision noise. At this time, in the charging inlet, an abutting surface between the inlet cap and the inlet body is wide such that the collision noise tends to be loud. It is possible that the collision noise being too loud leads to discomfort for the user.

Accordingly, the present invention is made by focusing on the above-described technical problem, and an object of the present invention is to provide a charging inlet capable of closing the inlet cap while suppressing the collision noise with the inlet body.

Solution to Problem

In order to solve the above-mentioned technical problem, a charging inlet is characterized by including an inlet body having a connection mechanism connecting with a mating connector for charging, the connection mechanism being accommodated in a housing to be exposed from a penetration hole provided on an outer wall of the housing; an inlet cap configured to occlude an occlusion area forming at least part of the penetration hole in the housing to make the occlusion area to be openable and closable and to cover a mechanical portion of the connection mechanism that is positioned in the occlusion area during an occlusion state; and a connection portion configured to connect a portion of a circumferential edge of the inlet cap to the outer wall of the housing in a hinge-connection style; wherein the inlet cap includes a plate-shaped cap body portion configured to face the occlusion area and a peripheral surface of the occlusion area on an external surface of the outer wall in the occlusion state; and an inlet abutment portion which is a projection locally provided at a position separating from the connection portion in a facing portion in the cap body portion hat faces the peripheral surface, wherein the inlet abutment portion comes into contact with the inlet body earlier than any other portion in the cap body portion when the cap body portion rotates to reach the occlusion state.

Effect of the Invention

According to the above-described charging inlet, it is possible to close the inlet cap while suppressing the collision noise with the inlet body.

BRIEF DESCRIPTION OF THE DRAWINGS

FIG. 1 is an exterior perspective view showing a charging inlet according to an embodiment.

DESCRIPTION OF EMBODIMENTS

Hereinafter, an embodiment of a charging inlet will be described.

Figure 1:
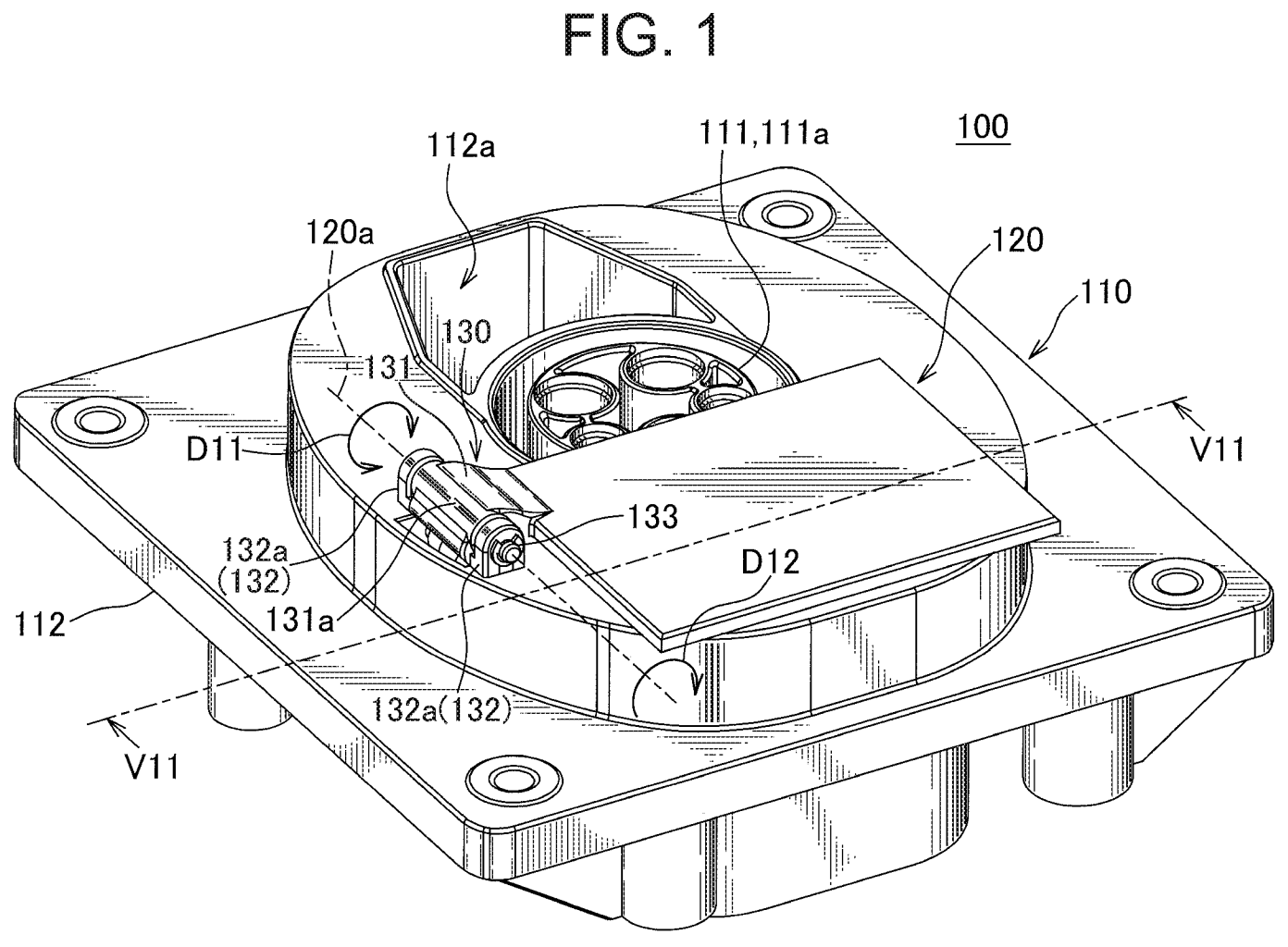
Figure 2:
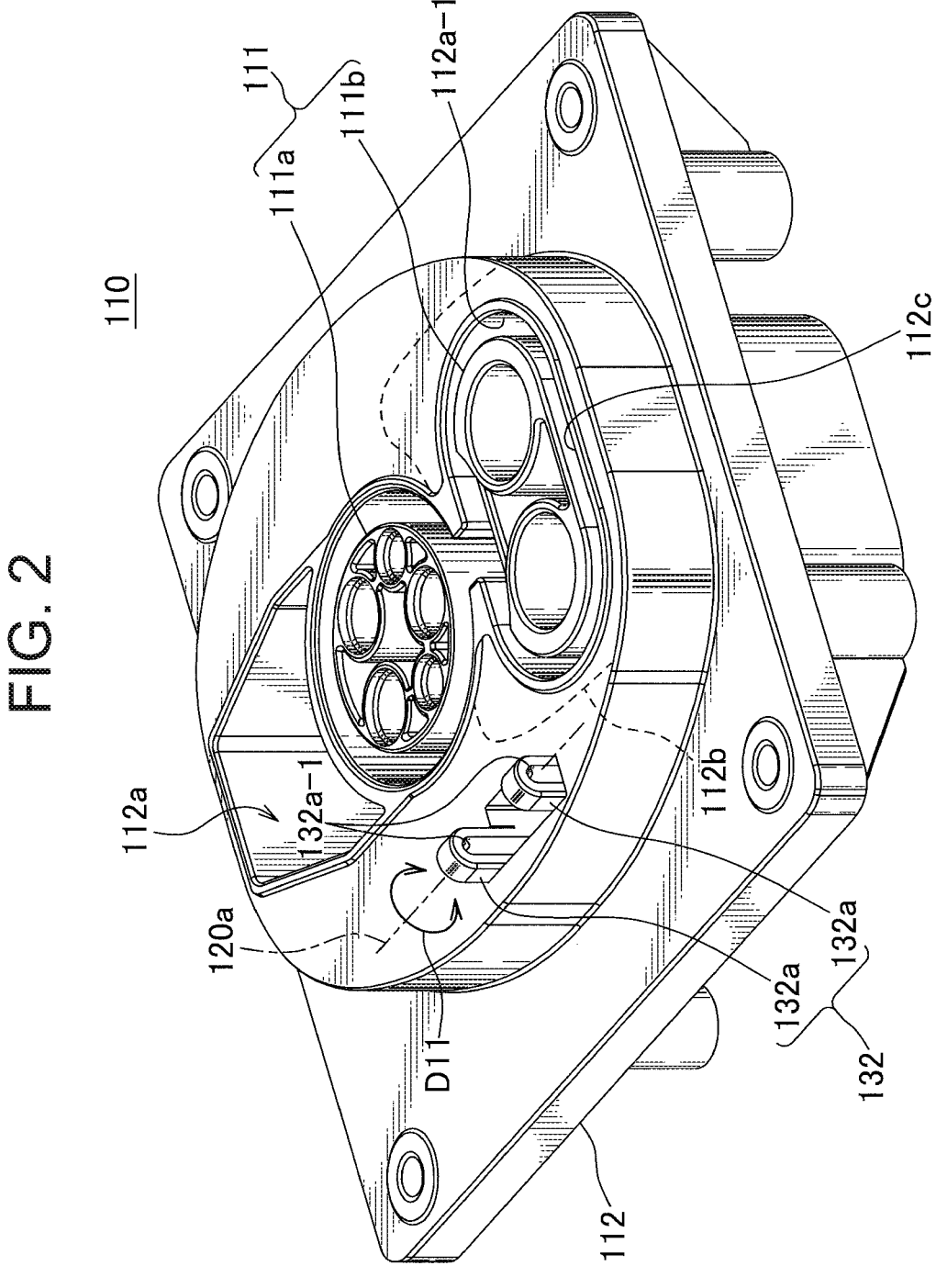
FIG. 2 is an exterior perspective view showing an inlet body in the charging inlet shown in FIG. 1.

FIG. 1 is an exterior perspective view showing a charging inlet according to an embodiment. FIG. 2 is an exterior perspective view showing an inlet body in the charging inlet shown in FIG. 1. According to the present embodiment, a charging inlet 100 is formed in a Combined Charging System (CCS) Type-1 socket shape, however, the charging inlet 100 may be formed in a socket shape corresponding to other charging standard.

The charging inlet 100 is a member used in the Electric Vehicle (EV), the Plug-in Hybrid Vehicle (PHV) or the like for charging the battery mounted on the vehicle body from the external energizer. The charging inlet 100 includes an inlet body 110, a DC socket cap (inlet cap) 120, and a connection portion 130 of the DC socket cap 120.

The inlet body 110 is a configuration in which a socket portion 111 as a connection mechanism with a mating connector for charging is accommodated in a housing 112 while being exposed from a penetration hole 112a provided on an outer wall of the housing 112. The housing 112 may be, for example, formed of an insulating resin.

The socket portion 111 is formed in a shape corresponding to the charging standard and configured to accommodate a plurality of terminals which are necessary for the charging. According to the present embodiment, the socket portion 111 includes an AC socket 111a and a DC socket 111b, wherein the socket portion 111 is accommodated so as to be exposed from a penetration hole 112a having a contour as connecting two approximately oval shapes in a T-shape when viewed from the connection direction with the mating connector. The AC socket 111a is accommodated in a hole portion equivalent to the vertical bar of the T-shape, and the DC socket 111b is accommodated in a hole portion equivalent to the horizontal bar of the T-shape.

The DC socket cap 120 is a cap member formed of the insulating resin, wherein the DC socket cap 120 is configured to occlude a DC socket area 112a-1 as an occlusion area, and the DC socket area 112a-1 is equivalent to the horizontal bar of the T-shaped penetration hole 112a in the housing 112. The DC socket cap 120 is configured to cover the DC socket 111b that is a mechanical portion positioned in the DC socket area 112a-1 in the socket portion 111 during an occlusion state.

The connection portion 130 is a portion configured to connect part of the circumferential edge of the DC socket cap 120 to the outer wall of the housing 112 in a hinge-connection style, and the connection portion 130 includes a cap-side connection portion 131, a housing-side connection portion 132, and a connection shaft 133. The cap-side connection portion 131 is a plate portion formed in an arm portion extending from the circumferential edge of the DC socket cap 120, and a cylindrical portion 131a into which the connection shaft 133 is fitted is formed in a tip edge portion thereof. The housing-side connection portion 132 is provided on the outer wall of the housing 112 in the vicinity of the DC socket area 112a-1, and the housing-side connection portion 132 is configured by a pair of bearing columns 132a standing to sandwich the cap-side connection portion 131 therebetween. Each bearing column 132a is provided with a fitting hole 132a-1 for the connection shaft 133 to be fitted therein. The connection shaft 133 is a shaft member being fitted therein to communicate the pair of bearing columns 132a and the cylindrical portion 131a of the cap-side connection portion 131 that is sandwiched between the pair of bearing columns 132a so as to define a rotation axis 120a of the DC socket cap 120. Due to the connection portion 130, the DC socket cap 120 is connected to the outer wall of the housing 112 in a hinge-connection style such that the DC socket area 112a-1 is openable and closable by a rotation in a rotation direction D11 around the rotation axis 120a. Also, a spring is attached to the connection portion 130 and the DC socket cap 120 is urged by spring in an occlusion direction D12 due to this spring. When the mating connector for charging is connected to the DC socket 111b, against the spring urging, the DC socket cap 120 is opened and the DC socket 111b is exposed to the outside. Then, when the charging is finished and the DC socket cap 120 is closed in the occlusion direction D12, the DC socket cap 120 is closed by a less force due to the urging force of the spring urging. Also, after the occlusion operation is finished, the occlusion of the DC socket cap 120 is maintained by the urging force.

Figure 3:
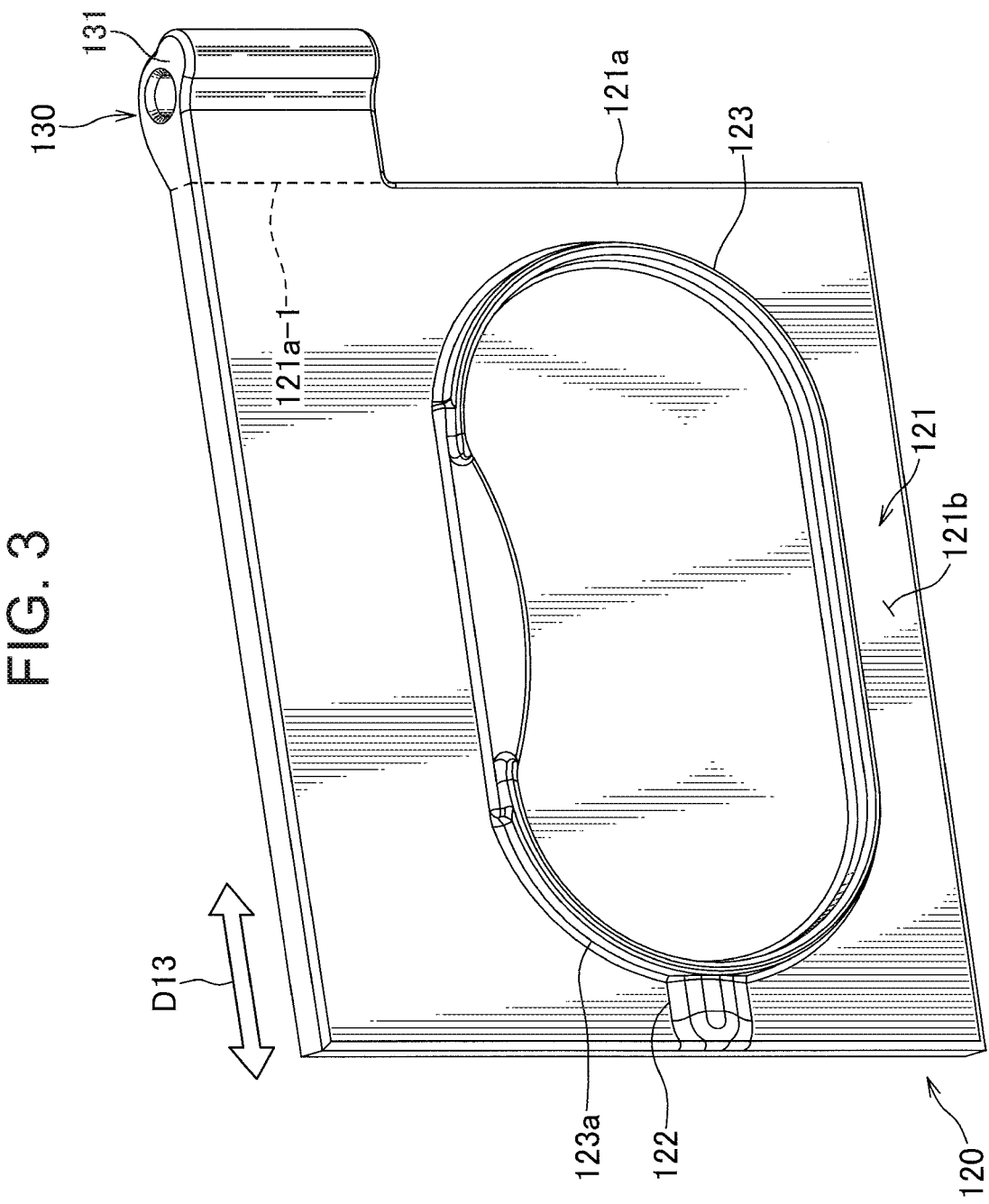
FIG. 3 is a view showing a DC socket cap shown in FIG. 1 when viewed from an occlusion-surface-side facing a DC socket area.
Figure 4:
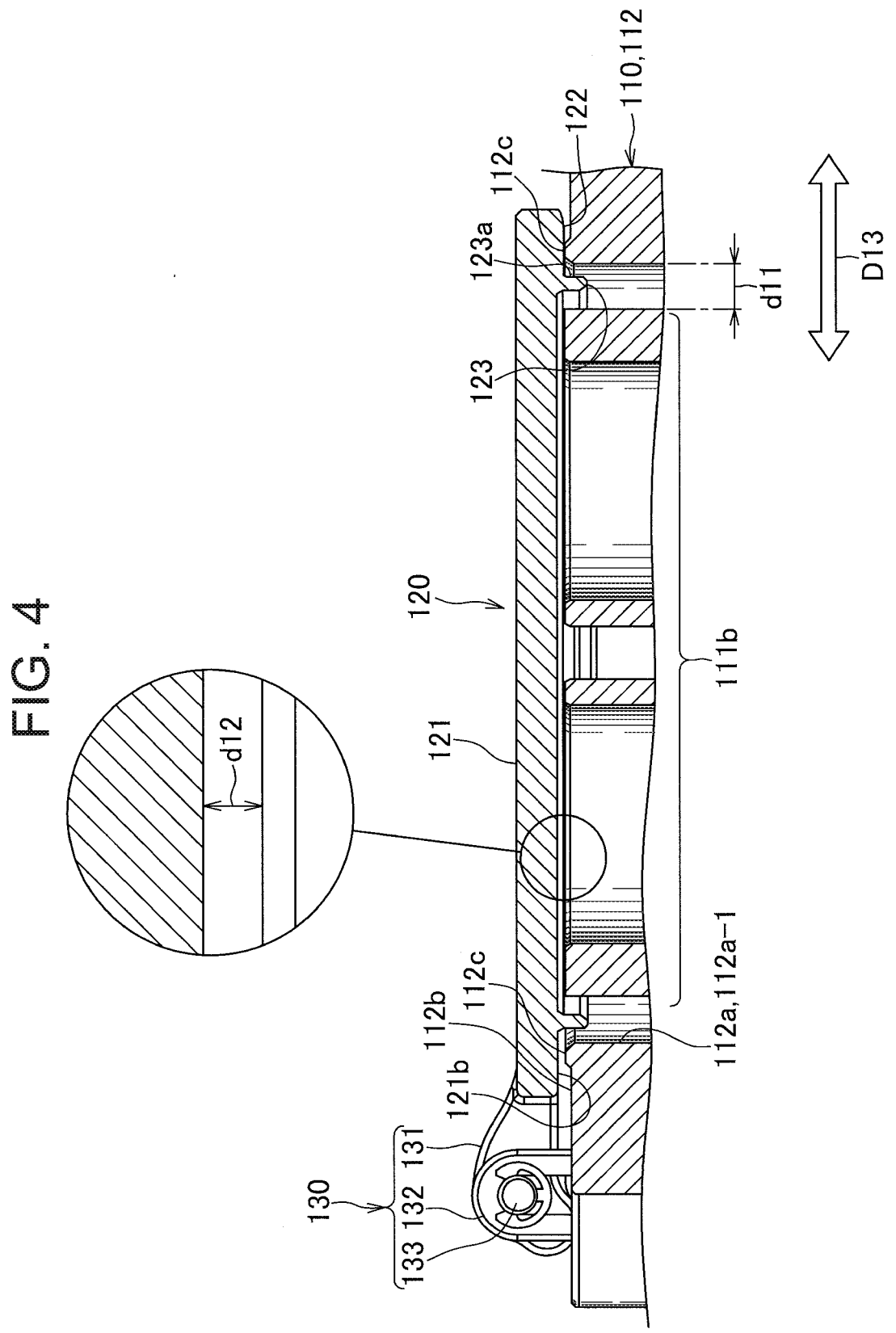
FIG. 4 is a partial cross-sectional view on a cross section taken along the V11-V11 line in FIG. 1 for showing the DC socket cap and the inlet body in an occlusion state.

FIG. 3 is a view showing the DC socket cap shown in FIG. 1 when viewed from the occlusion-surface-side facing the DC socket area, and FIG. 4 is a partial cross-sectional view on a cross section taken along the V11-V11 line in FIG. 1 for showing the DC socket cap and the inlet body in the occlusion state.

The DC socket cap 120 includes a plate-shaped cap body portion 121, an inlet abutment portion 122, and an entrance rib wall 123.

The cap body portion 121 is a portion, in the occlusion state, facing the DC socket area 112a-1 of the penetration hole 112a of the housing 112 in the inlet body 110 and the peripheral surface 112b of the DC socket area 112a-1 on the external surface of the outer wall of the housing 112. The cap body portion 121 is a plate-shaped member formed in an oval shape corresponding to the shape of the DC socket area 112a-1 that is equivalent to the horizontal bar of the T-shaped penetration hole 112a. Then, at one end side in the longitudinal direction of the cap body portion 121, the above-described cap-side connection portion 131 extends from a portion 121a-1 of the circumferential edge 121a.

The inlet abutment portion 122 is a projection locally provided at a position being separated from the cap-side connection portion 131 of the connection portion 130 in the facing portion 121b facing the peripheral surface 112b of the DC socket area 112a-1 in the cap body portion 121. This inlet abutment portion 122 comes into contact with the inlet body 110 earlier than any other portion of the cap body portion 121 when the cap body portion 121 rotates to reach the occlusion state in which the DC socket area 112a-1 is occluded. Here, according to the present embodiment, the inlet abutment portion 122 is provided at the farthest position from the connection portion 130 in the facing portion 121b while sandwiching the DC socket 111b therebetween with the connection portion 130 in the occlusion state. Then, with regard to the inlet abutment portion 122, at this position, a height of a top portion thereof is set such that the top portion thereof comes into contact with the inlet body 110 earlier than any other portion of the cap body portion 121.

Also, according to the present embodiment, as shown in FIG. 1 and FIG. 4, an edge rib wall 112c raising along the edge of the DC socket area 112a-1 is formed in a portion being closer to the DC socket area 112a-1 in the above-described peripheral surface 112b of the inlet body 110. The inlet abutment portion 122 comes into contact with the tip edge of the edge rib wall 112c when reaching the occlusion state. At this time, the inlet abutment portion 122 has a shape raising in a semi-cylindrical form extending from a center side of the cap body portion 121 toward the outer circumferential side in the facing portion 121b and with a direction intersecting with the tip edge of the edge rib wall 112c as a longitudinal direction D13 in the occlusion state. The inlet abutment portion 122 comes into contact with the tip edge of the edge rib wall 112c at a top portion of the semi-cylindrical shape.

According to the present embodiment, as shown in FIG. 2, the socket portion 111 is accommodated in the housing 112 with a state in which a gap between either of the AC socket 111a or the DC socket 111b and the inner circumferential edge of the penetration hole 112a is formed. Here, a gap d11 between the DC socket 111b and the inner circumferential edge of a DC socket area 112a-1 in the penetration hole 112a is focused on. Then, the annual entrance rib wall 123 entering the above-described gap d11 is provided at the inner side of the facing portion 121b so as to surround the circumference of the DC socket 111b in the occlusion state. Then, as shown in FIG. 3, the inlet abutment portion 122 has a shape of raising in the semi-cylindrical form extending from the outer circumferential surface 123a of the entrance rib wall 123 toward the outer circumferential side of the cap body portion 121.

According to the present embodiment, as shown in FIG. 4, regarding the above-described DC socket cap 120, in the occlusion state, the cap body portion 112 faces the DC socket area 112a-1 and the peripheral surface 112b thereof as shown below. That is, in the occlusion state, the cap body portion 121 faces the DC socket area 112a-1 and the peripheral surface 112b that the portion 121a-1 of the circumferential edge 121a thereof is connected to the outer wall of the housing 112 in the hinge-connection style, the inlet abutment portion 122 comes into contact with the inlet body 110, and the other portions are in a non-contact state. Here, the mentioned non-contact state refers to a state in which a gap d12 between the cap body portion 121 with the DC socket 111b of the socket portion 111, the peripheral surface 112b, and the tip edge of the edge rib wall 112c is formed. In the occlusion state, due to such a non-contact state, it is possible that the inlet abutment portion 122 comes into contact with the inlet body 110, while the cap body portion 121 faces the DC socket area 112*a*-1 and the peripheral surface 112*b* thereof.

According to the charging inlet 100 in the above-described embodiment, when the occlusion state in which the DC socket cap 120 is closed is reached, the inlet abutment portion 122 comes into contact with the inlet body 110 earlier than any portion in the cap body portion 121. That is, the collision noise between the DC socket cap 120 and the inlet body 110 at the time of occlusion substantially becomes the collision noise between the inlet abutment portion 122 and the inlet body 110. Also, since the inlet abutment portion 122 is the projection locally provided and the contact area with the inlet body 110 is decreased such that the collision noise with the inlet body 110 at the time of occlusion is suppressed. In this way, due to the above-described charging inlet 100, it is possible to close the DC socket cap 120 while suppressing the collision noise with the inlet body 110.

Also, according to the present embodiment, the inlet abutment portion 122 comes into contact with the inlet body 110 earlier than either portion in the cap body portion 121 at a position separating from the connection portion 130. Accordingly, it is possible to effectively suppress the generation of an event, during the occlusion, in which a portion in the cap body portion 121 that is in the vicinity of the connection portion 130, in other words, the peripheral portion of the rotation axis 120*a* interferes with the inlet body 110 such that the DC socket cap 120 is not completely closed.

Here, according to the present embodiment, in the occlusion state, regarding the DC socket cap 120 except for the connection portion 130 and the inlet abutment portion 122, the cap body portion 121 faces the DC socket area 112*a*-1 and the peripheral surface 112*b* in the non-contact state. According to the configuration, the cap body portion 121 and the inlet body 110 are configured in the non-contact state such that it is possible to close the DC socket cap 120 while further suppressing the collision noise with the inlet body 110. Also, it is possible to close the DC socket cap 120 in the non-contact area such that the interference with the inlet body 110 can be further suppressed.

According to the present embodiment, the inlet abutment portion 122 is provided at the farthest position from the connection portion 130 where in the facing portion 121*b*, the inlet abutment portion 122 and the connection portion 130 sandwich the DC socket 111*b* therebetween in the occlusion state. The farthest position from the connection portion 130 in the facing portion 121*b* becomes the portion comes into contact with the peripheral surface 112*b* with the strongest force when the DC socket cap 120 is closed. According to the above-described configuration, the inlet abutment portion 122 is formed in this portion to suppress the contact area with the peripheral surface 112*b* in the portion such that it is possible to close the DC socket cap 120 while further effectively suppressing the collision noise during the occlusion.

Also, according to the present embodiment, the edge rib wall 112*c* is formed along the edge of the DC socket area 112*a*-1 in the peripheral surface 112*b* of this DC socket area 112*a*-1. Then, the inlet abutment portion 122 comes into contact with the tip edge of the edge rib wall 112*c* when reaching the occlusion state. According to the configuration, the contact area between the inlet abutment portion 122 and the inlet body 110 is further decreased such that it is possible to further the collision noise with the inlet body 110 during the occlusion.

According to the present embodiment, the inlet abutment portion 122 has a shape raising as the semi-cylindrical form extending from the center side of the cap body portion 121 toward the outer circumferential side in the facing portion 121*b* with a direction intersecting with the tip edge of the edge rib wall 112*c* as a longitudinal direction D13. According to the configuration, since the inlet abutment portion 122 comes into contact with the edge rib wall 112*c* at the top portion of the semi-cylindrical form, the contact area with the inlet body 110 is further decreased such that the collision noise with the inlet body 110 during the occlusion can be further suppressed.

According to the present embodiment, in the cap body portion 121, the annular entrance rib wall 123 entering the gap d11 between the inner circumferential edge of the penetration hole 112*a* and the DC socket 111*b* is provided at the inner side of the facing portion 121*b*. Then, the inlet abutment portion 122 has the shape raising in the semi-cylindrical form extending from the outer circumferential surface 123*a* of the entrance rib wall 123 toward the outer circumferential side of the cap body portion 121. According to the configuration, the annular entrance rib wall 123 entering the gap d11 in the occlusion state surrounds the circumference of the DC socket 111*b* such that it is possible to improve the occlusion capability with respect to the DC socket 111*b* by the DC socket cap 120. Also, together with the annular entrance rib wall 123, the inlet abutment portion 122 having the semi-cylindrical shape extending from the outer circumferential surface 123*a* thereof functions as a strength enhancement member in the DC socket cap 120 such that it is possible to improve the strength of the DC socket cap 120.

The above-described embodiment merely shows the typical aspects of the charging inlet. The charging inlet is not limited to these aspects and can be variously modified and implemented.

For example, according to the above-described embodiment, as an example of the charging inlet, the charging inlet 100 for the battery charging is used in the Electric Vehicle (EV), the Plug-in Hybrid Vehicle (PHV) or the like. However, the charging inlet is not limited to this configuration, and as long as the charging inlet has the connection mechanism with the mating connector for charging, the applicable target thereof is not particularly limited.

According to the above-described embodiment, as an example of the connection mechanism where the inlet cap at least covers part of the mechanical portion, the socket portion 111 where the DC socket 111*b* is covered by the DC socket cap 120 is shown as an example. However, this connection mechanism is not limited to this configuration, wherein as long as the connection mechanism is a connection mechanism with the mating connector for charging, the connection mechanism may only have either of the DC socket or the AC socket, and the specific mechanical aspect is not particularly limited.

Also, according to the above-described embodiment, as an example of the inlet cap, the DC socket cap 120 is shown as the example of occluding the DC socket area 112*a*-1 to make the DC socket area 112*a*-1 to be openable and closable, wherein the DC socket area 112*a*-1 forms part of the penetration hole 112*a* of the housing 112. The DC socket cap 120 covers the DC socket 111*b* in the socket portion 111 in the occlusion state. However, the inlet cap is not limited to this configuration, and as long as the inlet cap is the configuration occluding the occlusion area forming at least part of the penetration hole in the housing, the inlet cap may be the configuration occluding the whole penetration hole. Also, even the inlet cap is the configuration occluding the part of the penetration hole as the occlusion area, the occlusion area is not limited to the DC socket area, and the inlet cap may be the configuration to occlude the AC socket area where the AC socket is positioned at the inner side thereof as the occlusion area.

Also, according to the above-described embodiment, as an example of the inlet cap, the DC socket cap 120 is shown as the example which occlude the DC socket area 112a-1 in the non-contact state except for the connection portion 130 and the inlet abutment portion 122, in the occlusion state. However, the inlet cap is not limited to this configuration, and the inlet cap may be a configuration that is in contact with the inlet body in other portions except for the connection portion and the inlet abutment portion. Nevertheless, as described above, by making the other portions except for the connection portion 130 and the inlet abutment portion 122 to be in the non-contact state, it is possible to further suppress the collision noise and to further suppress the interference with the inlet body 110.

Also, according to the above-described embodiment, as an example of the inlet abutment portion, the inlet abutment portion 122 is shown as an example which sandwiches the DC socket 111b therebetween with the connection portion 130 and is provided at the farthest position from the connection portion 130. However, the inlet abutment portion is not limited to this configuration, wherein the inlet abutment portion may be provided at a position separating from the connection portion by the same degree compared with that from the DC socket, or the inlet abutment portion may be provided to be closer to the connection portion side than that of the DC socket. Nevertheless, as described above, the inlet abutment portion 122 is configured to sandwich the DC socket 111b therebetween with the connection portion 130 and provided at the farthest position from the connection portion 130 such that the collision noise is further effectively suppressed during the occlusion.

Also, as described above, as an example of the charging inlet, the charging inlet 100 is shown as an example in which the edge rib wall 112c is formed along the edge of DC socket area 112a-1, and the inlet abutment portion 122 comes into contact with the tip edge of this edge rib wall 112c during the occlusion state. However, the charging inlet is not limited to this configuration, and the charging inlet may be a configuration in which the edge rib wall or the like is not provided therein, and the inlet abutment portion comes into contact with a flat surface in the occlusion state. Nevertheless, as described above, the inlet abutment portion 122 is configured to come into contact with the tip edge of the edge rib wall 112c such that it is possible to further suppress the collision noise during the occlusion.

Also, according to the above-described embodiment, as an example of the charging inlet, the charging inlet 100 is shown as an example in which the inlet abutment portion 122 with the shape of raising in the semi-cylindrical form intersects with and comes into contact with the tip edge of the edge rib wall 112c. However, the charging inlet is not limited to this configuration, and the specific shape of the inlet abutment portion for coming into contact with the tip edge of the edge rib wall may be set to any appropriate shape. Nevertheless, as described above, the inlet abutment portion 122 with the shape of raising in the semi-cylindrical shape is configured to intersect with and come into contact with the tip edge of the edge rib wall 112c such that it is possible to further suppress the collision noise during the occlusion.

Also, according to the above-described embodiment, as an example of the inlet cap, the DC socket cap 120 is shown as an example in which the inlet abutment portion 122 with the semi-cylindrical shape extends from the outer circumferential surface 123a of the annular entrance rib wall 123 toward the outer side. However, the inlet cap is not limited to this configuration, wherein the entrance rib wall or the like may not be provided therein, and the specific shape of the inlet cap may be set to any appropriate shape. Nevertheless, as described above, the annular entrance rib wall 123 and the inlet abutment portion 122 in the semi-cylindrical form extending from the outer circumferential surface 123a thereof are provided such that it is possible to improve the occlusion capability with respect to the DC socket 111b as the mechanical portion of the occlusion target and improve the cap strength.

REFERENCE SIGNS LIST

100 charging inlet
110 inlet body
111 socket portion (connection mechanism)
111a AC socket
111b DC socket (mechanical portion)
112 housing
112a penetration hole
112a-1 DC socket area (occlusion area)
112b peripheral surface
112c edge rib wall
120 DC socket cap (inlet cap)
120a rotation axis
121 cap body portion
121a circumferential edge
121a-1 portion
121b facing portion
122 inlet abutment portion
123 entrance rib wall
123a outer circumferential surface
130 connection portion
131 cap-side connection portion
132 housing-side connection portion
132a bearing column
132a-1 fitting hole
133 connection shaft
d11, d12 gap
D11 rotation direction
D12 occlusion direction
D13 longitudinal direction

What is claimed is:
1. A charging inlet, comprising:
an inlet body comprising:
   a housing including an outer wall, the outer wall including a penetration hole;
   a connection mechanism configured to connect with a mating connector for charging, the connection mechanism being accommodated in the housing to be exposed from the penetration hole;
an inlet cap configured to occlude an occlusion area forming at least part of the penetration hole in the housing to make the occlusion area to be openable and closable and to cover a mechanical portion of the connection mechanism that is positioned in the occlusion area during an occlusion state; and
a connection portion configured to connect a portion of a circumferential edge of the inlet cap to the outer wall of the housing in a hinge-connection style;
wherein the inlet cap comprises a plate-shaped cap body portion configured to face the occlusion area and a peripheral surface of the occlusion area on an external surface of the outer wall in the occlusion state; and an inlet abutment portion that is a projection provided in a facing portion of the cap body portion at a position separated from the connection portion, the facing portion configured to face the peripheral surface, and wherein the inlet abutment portion comes into contact with a portion of the inlet body earlier than any other portion of the cap body portion when the cap body portion rotates to reach the occlusion state, the portion of the inlet body being outside of the penetration hole.

2. The charging inlet according to claim 1, wherein in the occlusion state, while the portion of the circumferential edge is connected to the outer wall in the hinge-connection style and the inlet abutment portion comes into contact with the inlet body, the cap body portion faces the occlusion area and the peripheral surface in a non-contact state in which a gap between the cap body portion with the mechanical portion of the connection mechanism and the peripheral surface is formed.

3. The charging inlet according to claim 1, wherein the inlet abutment portion is provided at the farthest position from the connection portion in the facing portion to sandwich the mechanical portion therebetween with the connection portion in the occlusion state.

4. The charging inlet according to claim 1, wherein the connection mechanism is accommodated in the housing in a state in which a gap is formed between an inner circumferential edge of the penetration hole and the mechanical portion, an annular entrance rib wall is provided at an inner side of the facing portion in the cap body portion, the entrance rib wall configured to enter the gap so as to surround the mechanical portion in the occlusion state, and the inlet abutment portion has a shape raising in a semi-cylindrical form extending from a circumferential surface of the entrance rib wall toward a circumferential side of the cap body portion.

5. The charging inlet according to claim 1, wherein the inlet body further comprises an edge rib wall that protrudes from the peripheral surface of the inlet body, outside of the penetration hole, along an edge of the occlusion area, and the inlet abutment portion comes into contact with a tip edge of the edge rib wall when the occlusion state is reached.

6. The charging inlet according to claim 5, wherein the inlet abutment portion has a shape raising in a semi-cylindrical form extending from a center side toward an outer circumferential side of the cap body portion in the facing portion with a direction intersecting with the tip edge of the edge rib wall as a longitudinal direction, in the occlusion state.

7. A charging inlet, comprising:

an inlet body comprising:

a housing including an outer wall, the outer wall including a penetration hole;

a connection mechanism configured to connect with a mating connector for charging, the connection mechanism being accommodated in the housing to be exposed from the penetration hole;

an inlet cap configured to occlude an occlusion area forming at least part of the penetration hole in the housing to make the occlusion area to be openable and closable and to cover a mechanical portion of the connection mechanism that is positioned in the occlusion area during an occlusion state; and a connection portion configured to connect a portion of a circumferential edge of the inlet cap to the outer wall of the housing in a hinge-connection style;

wherein the inlet cap comprises a plate-shaped cap body portion configured to face the occlusion area and a peripheral surface of the occlusion area on an external surface of the outer wall in the occlusion state; and an inlet abutment portion that is a projection provided in a facing portion of the cap body portion at a position separated from the connection portion, the facing portion configured to face the peripheral surface, wherein the inlet abutment portion comes into contact with the inlet body earlier than any other portion of the cap body portion when the cap body portion rotates to reach the occlusion state, wherein the inlet body further comprises an edge rib wall that protrudes from the peripheral surface of the inlet body along an edge of the occlusion area, wherein the inlet abutment portion comes into contact with a tip edge of the edge rib wall when the occlusion state is reached, and wherein the inlet abutment portion has a shape raising in a semi-cylindrical form extending from a center side toward an outer circumferential side of the cap body portion in the facing portion with a direction intersecting with the tip edge of the edge rib wall as a longitudinal direction, in the occlusion state.

8. A charging inlet, comprising:

an inlet body comprising:

a housing including an outer wall, the outer wall including a penetration hole;

a connection mechanism configured to connect with a mating connector for charging, the connection mechanism being accommodated in the housing to be exposed from the penetration hole;

an inlet cap configured to occlude an occlusion area forming at least part of the penetration hole in the housing to make the occlusion area to be openable and closable and to cover a mechanical portion of the connection mechanism that is positioned in the occlusion area during an occlusion state; and a connection portion configured to connect a portion of a circumferential edge of the inlet cap to the outer wall of the housing in a hinge-connection style;

wherein the inlet cap comprises a plate-shaped cap body portion configured to face the occlusion area and a peripheral surface of the occlusion area on an external surface of the outer wall in the occlusion state; and an inlet abutment portion that is a projection provided in a facing portion of the cap body portion at a position separated from the connection portion, the facing portion configured to face the peripheral surface, wherein the inlet abutment portion comes into contact with the inlet body earlier than any other portion of the cap body portion when the cap body portion rotates to reach the occlusion state, wherein the connection mechanism is accommodated in the housing in a state in which a gap is formed between an inner circumferential edge of the penetration hole and the mechanical portion, wherein an annular entrance rib wall is provided at an inner side of the facing portion in the cap body portion, the entrance rib wall configured to enter the gap so as to surround the mechanical portion in the occlusion state, and wherein the inlet abutment portion has a shape raising in a semi-cylindrical form extending from a circumferential surface of the entrance rib wall toward a circumferential side of the cap body portion.

* * * * *